United States Patent [19]
Santi et al.

[11] Patent Number: 5,969,484
[45] Date of Patent: Oct. 19, 1999

[54] ELECTRONIC BALLAST

[75] Inventors: Enrico Santi, Lake Forest; Zhe Zhang, Rancho Santa Margarita; Slobodan Cuk, Laguna Hills, all of Calif.

[73] Assignee: Optimum Power Conversion, Inc., Irvine, Calif.

[21] Appl. No.: 09/079,059

[22] Filed: May 14, 1998

[51] Int. Cl.⁶ .................................................. H05B 37/00
[52] U.S. Cl. .................... 315/247; 315/224; 315/DIG. 7; 315/307
[58] Field of Search ............................. 315/247, DIG. 7, 315/224, 307, 291

[56] References Cited

U.S. PATENT DOCUMENTS 3,789,266  1/1974  Polman et al. ...................... 315/DIG. 1
4,277,728  7/1981  Stevens .................................... 315/247

*Primary Examiner*—Michael B Shingleton
*Attorney, Agent, or Firm*—A. M. Fernandez

[57] ABSTRACT

A discontinuous conduction mode (DCM) electronic ballast topology is presented which drives the lamp with line frequency voltage and current, just like a magnetic ballast. However, compared to magnetic ballast, its weight is substantially reduced due to operation at high switching frequency (40 kHz in the experimental prototype). The topology also ensures unity power factor at the input and stable lamp operation at the output.

6 Claims, 16 Drawing Sheets

PRIOR-ART

PRIOR-ART

PRIOR-ART

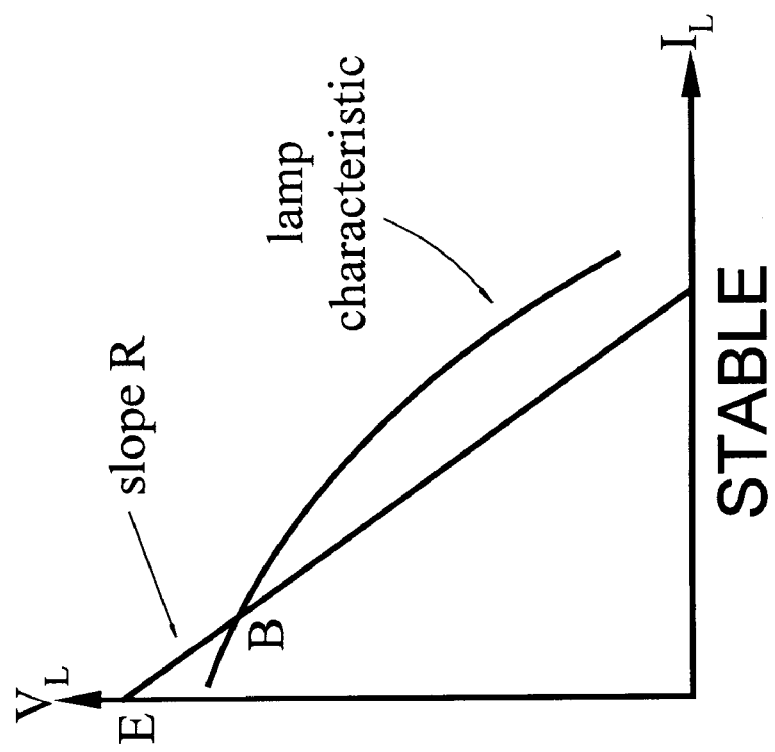
FIG. 8b STABLE
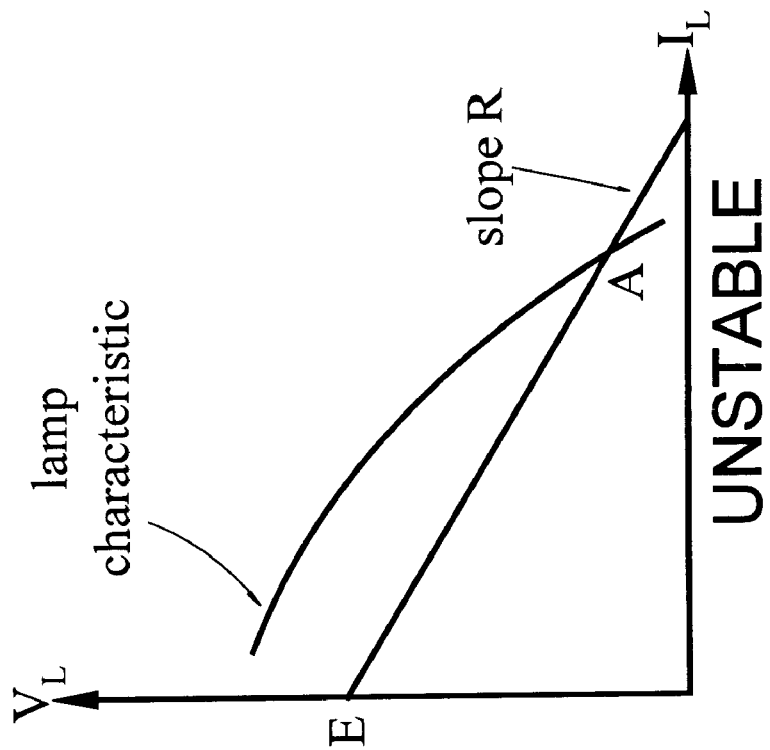
FIG. 8a UNSTABLE

ELECTRONIC BALLAST

FIELD OF THE INVENTION

The present invention relates to a switching power converter for transforming an input low frequency ac voltage (or dc voltage) into a sinusoidal low frequency voltage and current for ac loads, and more specifically to an electronic ballast for gas discharge lamps.

BACKGROUND OF THE INVENTION

It is well known that fluorescent lamps have a negative incremental impedance. (W. Elenbaas, Ed., *"Fluorescent Lamps and Lighting,"* Macmillan, London, 1959 and E. Deng and S. Cuk, "Negative Incremental Impedance and Stability of Fluorescent Lamps," IEEE Applied Power Electronics Conference, 1997 Record.) Therefore, they cannot be connected directly to an ac voltage source: they require a ballast for stable operation.

There are several requirements for fluorescent light ballasts. A particularly critical requirement for airplane applications is low radiated noise because there are strict specifications limiting radiated emissions in order to avoid risk of malfunction of airplane electronics. One of the commonly used sets of specifications is DO-160C developed by the Radio Technical Commission of Aeronautics. The specifications are given in the frequency domain and involve RF-frequency components. The range of frequencies of interest goes from 160 KHz to 1,215 MHz. Lamp voltages and currents should be sinusoidal with little distortion, so that RF-frequency harmonic components are small. Otherwise, the lamp acts like an antenna and radiated noise is high. The input voltage to the ballast can be DC or low-frequency ac voltage (50 Hz, 60 Hz or 400 Hz) and, if the lamp voltages and currents are at the same frequency of the input voltage, compliance with DO-160C is not difficult to achieve. The harmonics of the output voltage and current drop off as frequency increases, so that long before reaching 160 KHz (the minimum frequency for which there is a limit on emissions), the harmonics are negligible. Low-frequency, low-distortion lamp voltage and current are therefore desirable. Conversely, high-frequency lamp voltage and current make it harder to comply with DO-160C since the first few harmonics of lamp voltage and current fall within the frequency range of DO-160C. Other requirements are:

Lamp current stabilization—the ballast must be capable of stabilizing the lamp current.

High input power factor—In the case of ac input power, high input power factor is a common requirement.

Small size and weight—This requirement is particularly important for airplane applications.

Lamp dimming capability—This is a common requirement. Some ballasts have a two-level dimming capability, full bright and dim. It is sometimes desirable to be able to continuously dim the lamp as a function of a given control signal. Prior-art ballasts can be divided in two categories: magnetic and electronic ballasts.

Magnetic Ballast: In the past, so-called magnetic ballasts were used extensively. Basically, a magnetic ballast consists of a large inductor (or autotransformer) placed between the ac source and the lamp. The impedance of the inductor stabilizes the lamp. The lamp voltage and current are at the same frequency of the input ac source, as indicated in FIG. 1. They are sinusoidal with very little high-frequency components, so these ballasts have low radiated noise. As a matter of fact, most ballasts used in commercial airplanes today are of this type. The input current is sinusoidal with little distortion and it has a lagging power factor due to the inductor. A capacitor at the input could be used to improve power factor. A disadvantage of this approach is large size and weight, since the line-frequency inductor used in the ballast is large. Another disadvantage is that continuous dimming is hard to implement.

High-Frequency Electronic Ballast: In the recent technical literature, there are many examples of high-frequency electronic ballasts that use switching power converters (E. Deng and S. Cuk, "Single Stage, High Power Factor, Lamp Ballast," IEEE Applied Power Electronics Conference, 1994 Record and J. M. Alonso et al., "Analysis and Experimental Results of a Single-Stage High-Power Factor Electronic Ballast Based on Flyback Converter," IEEE Applied Power Electronics Conference, 1998 Record). A block diagram of a conventional high-frequency electronic ballast is shown in FIG. 2a. A diode bridge 10 rectifies the input ac voltage, and a switching converter 11 generates a square wave voltage at the switching frequency. A matching network 12 is interposed between the switching converter output and the gas discharge lamp. This matching network is usually a high-frequency resonant filter (usually an LCC filter) tuned to a frequency equal to (or close to) the switching frequency. It attenuates all the harmonics of the square-wave voltage passing only the fundamental. Furthermore, the matching network transforms the switching converter output characteristic from a voltage source into a current source, thus ensuring stable lamp operation. A high input power factor can be obtained either by using a two-stage converter consisting of a unity-power-factor shaper followed by a high-frequency inverter or by using a single stage converter, which usually operates in discontinuous conduction mode (DCM) at the input. An example of prior-art two-stage converter is shown in FIG. 2b described in U.S. Pat. No. 5,416,387. Block 11 of FIG. 2a is implemented in the embodiment of FIG. 2b as a unity-power-factor boost converter, which ensures unity power factor, followed by a half-bridge converter comprising switches $Q_2$ and $Q_3$. Output capacitor $C_1$ of the boost converter is large and stores significant energy at the input line frequency. Block 11 is followed by a matching network. An example of a prior-art single-stage converter is shown in FIG. 2c also described in the aforesaid patent. The unity-power-factor converter and the downstream dc—dc converter of FIG. 2b are combined in a single conversion stage operating in DCM of diode $D_1$. Capacitor $C_1$ is large and stores significant energy at the input line frequency. A matching network is used in the output to ensure stable lamp operation. Notice that in this approach of FIG. 2c the lamp current is a high frequency sinusoid at the switching frequency of the converter, as shown in FIG. 2a. As a result, there is a potential radiated noise problem.

An advantage of high-frequency ballasts is reduced size and weight of magnetic elements such as inductors and transformers due to the high-frequency operation. Another advantage is the ease of implementing continuous dimming capability by closing a current feedback control loop around the electronic ballast. In conclusion, the electronic ballast has all the desirable properties except that the lamp voltage and current are at high frequency, with a concomitant radiated noise problem.

Another type of fluorescent light ballast is described in U.S. Pat. No. 5,428,268. In this prior-art implementation the lamp voltage and current are a low frequency square wave. Notice that a square wave voltage is rich in high frequency harmonics and therefore it has significant radiated noise. The solution was also rather complicated, with a—unity power factor preregulator, a dc—dc power supply and a low frequency inverter.

Thus, most prior-art electronic ballasts for fluorescent lamps provide a sinusoidal lamp current at the switching frequency, and the high-frequency lamp voltage and current can generate significant radiated noise, which is unacceptable in noise-sensitive applications, such as fluorescent lights in airplanes.

STATEMENT OF THE INVENTION

An object of the present invention is to combine the advantages of electronic ballasts (small size and weight, continuous dimming capability) with the one significant advantage of a magnetic ballast, i.e., low radiated noise due to low-frequency lamp voltage and current.

In accordance with the present invention, a novel discontinuous conduction mode (DCM) electronic ballast topology utilizes a switching frequency of several kHz, but gives a lamp voltage and current at the same frequency as the input voltage, thus emulating a magnetic ballast. The high output impedance of the switching converter operating in DCM stabilizes the lamp. The converter also draws a sinusoidal current from the input ensuring high power factor. The advantages of reduced size and weight and of continuous dimming capability are thus realized by this invention.

The novel features that are considered characteristic of this invention are set forth with particularity in the appended claims. The invention will best be understood from the following description when read in connection with the accompanying drawings.

BRIEF DESCRIPTION OF THE DRAWINGS

FIGS. 8a and 8b show the dc lamp characteristic and the characteristic of the remaining circuit of the dc ballast of FIG. 7 for two different values of ballast resistance R resulting in unstable operation and stable operation, respectively.

DETAILED DESCRIPTION OF THE INVENTION

Figure 3A:
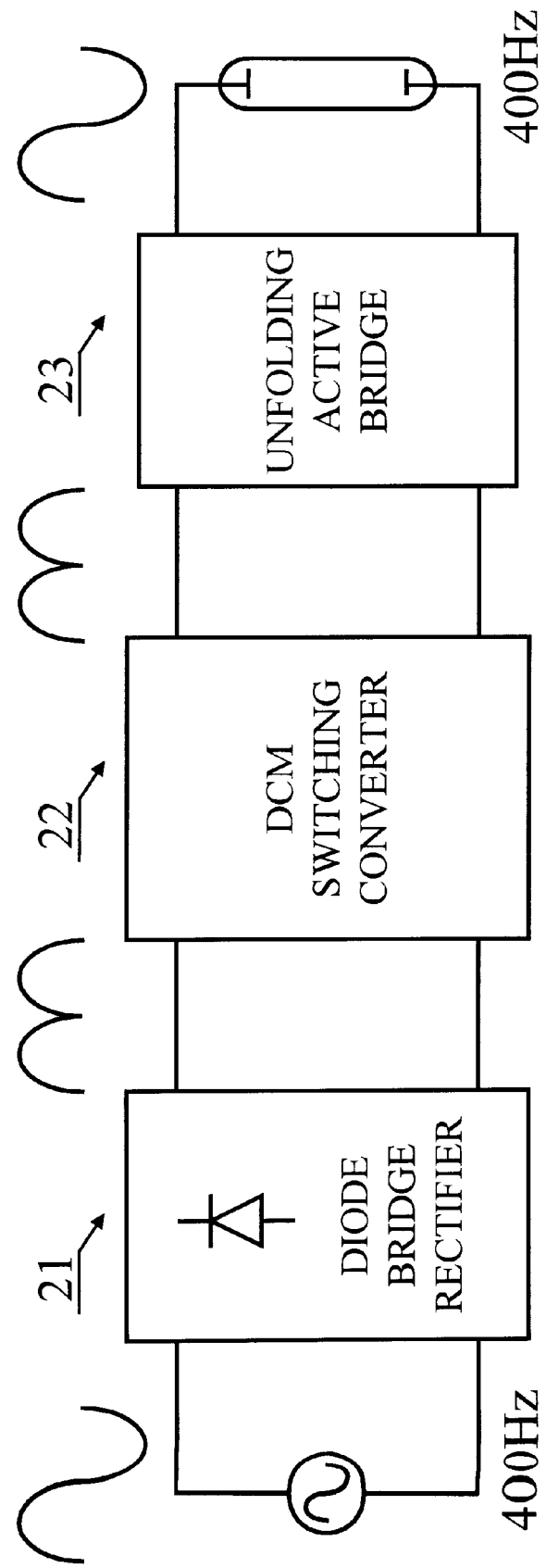
FIG. 3a is a block diagram of the present invention showing input and output voltage waveform of each block.
Figure 3B:
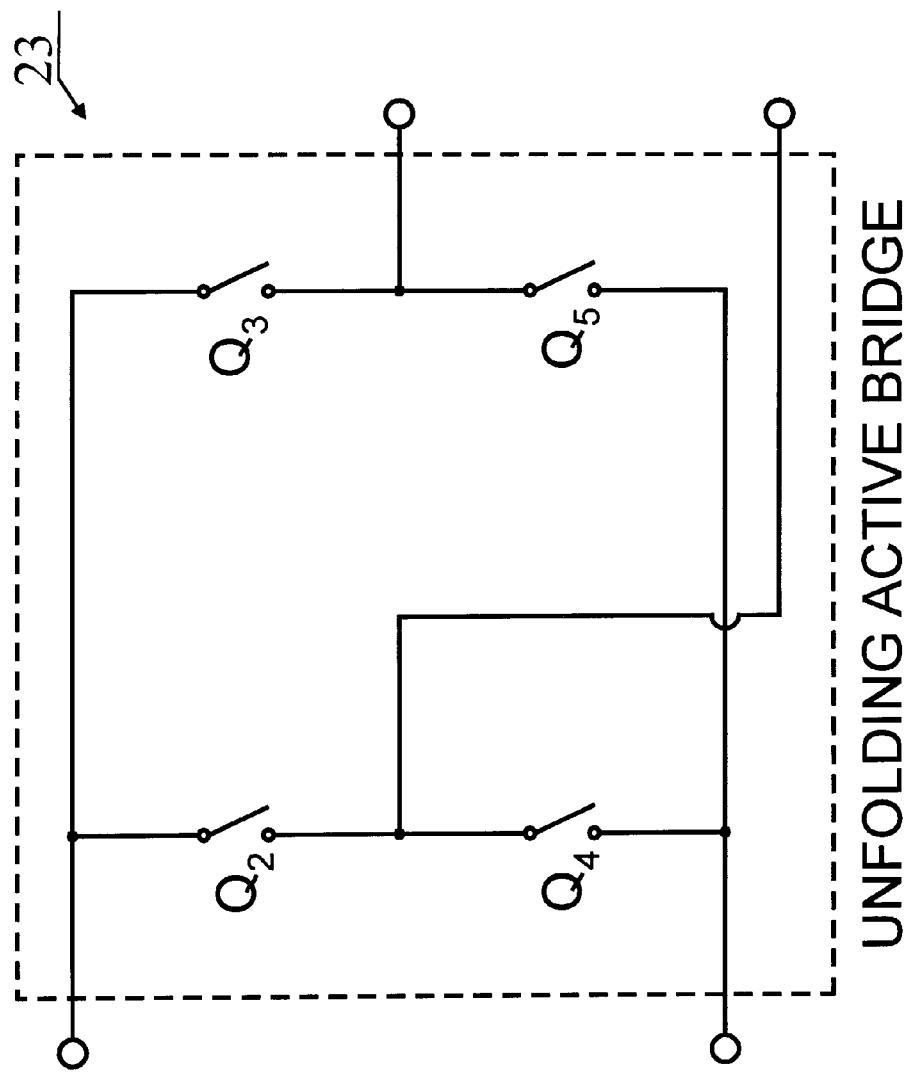
FIG. 3b shows a four-switch implementation of the unfolding active bridge in which switches $Q_2$, $Q_5$ and $Q_3$, $Q_4$ are turned on and off alternately, reversing polarity of connection between input and output.

A block diagram of the present invention is shown in FIG. 3a. It comprises a diode bridge rectifier 21, a switching converter 22 operating in discontinuous conduction mode with no line-frequency energy storage, and an unfolding active bridge 23 that takes the rectified sine wave of the output voltage of the converter and "unfolds" it, creating a sinusoidal output voltage that is applied to the lamp. The unfolding active bridge operates at the frequency of the input ac voltage (400 Hz in the case of airplane applications) and the switching instants are synchronized to the input ac voltage. The unfolding bridge is preferably a bridge circuit with four switches $Q_2$, $Q_3$, $Q_4$ and $Q_5$ as shown in FIG. 3b. Diametrically opposite switches $Q_2$ and $Q_5$ are turned on and off together with switches $Q_3$ and $Q_4$ which are turned off and on so that while one pair is on the other is off. When switches $Q_2$ and $Q_5$ are on and the remaining switches are off, the input is connected to the output with a certain polarity. When switches $Q_3$ and $Q_4$ are on and the remaining switches are off, the input is connected to the output with the opposite polarity. A control synchronized with the zero crossings of the ac voltage alternates conduction of the paired switches $Q_2$, $Q_5$ and switches $Q_3$, $Q_4$, alternating polarity of the connection between input and output of the unfolding stage. As a result, the unfolding stage transforms the rectified sine wave into a (nonrectified) sine wave.

Note that the invention does not use a matching network like the high-frequency ballasts of the prior art. A matching network tuned to the line frequency would be very large so that the advantage of reduced size and weight of electronic ballasts would be lost.

Figure 1:
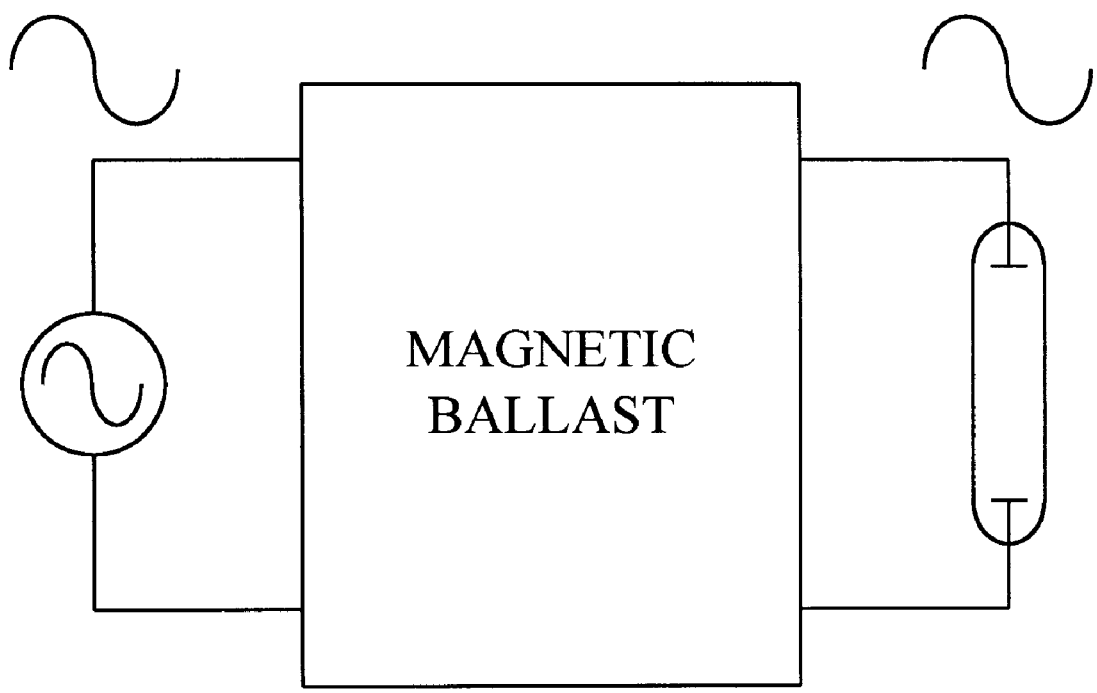
FIG. 1 illustrates a magnetic ballast having input and output voltage waveforms at the same frequency.
Figure 2A:
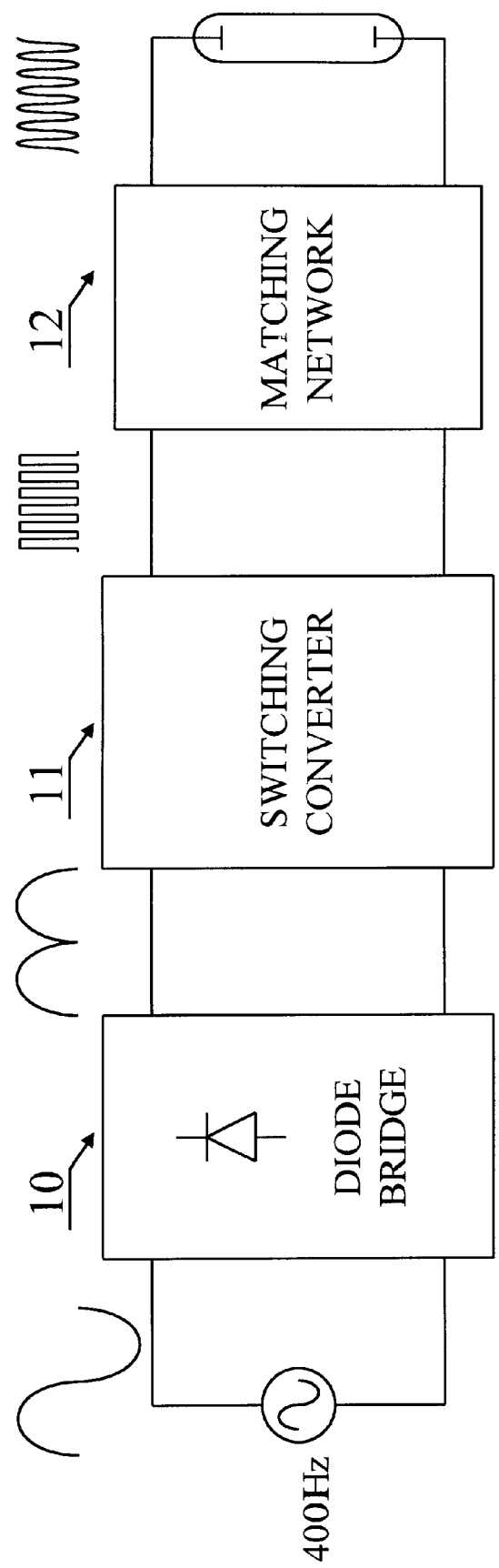
FIG. 2a is a block diagram of a prior-art high-frequency electronic ballast showing voltage waveforms at the input and output of each block.
Figure 2B:
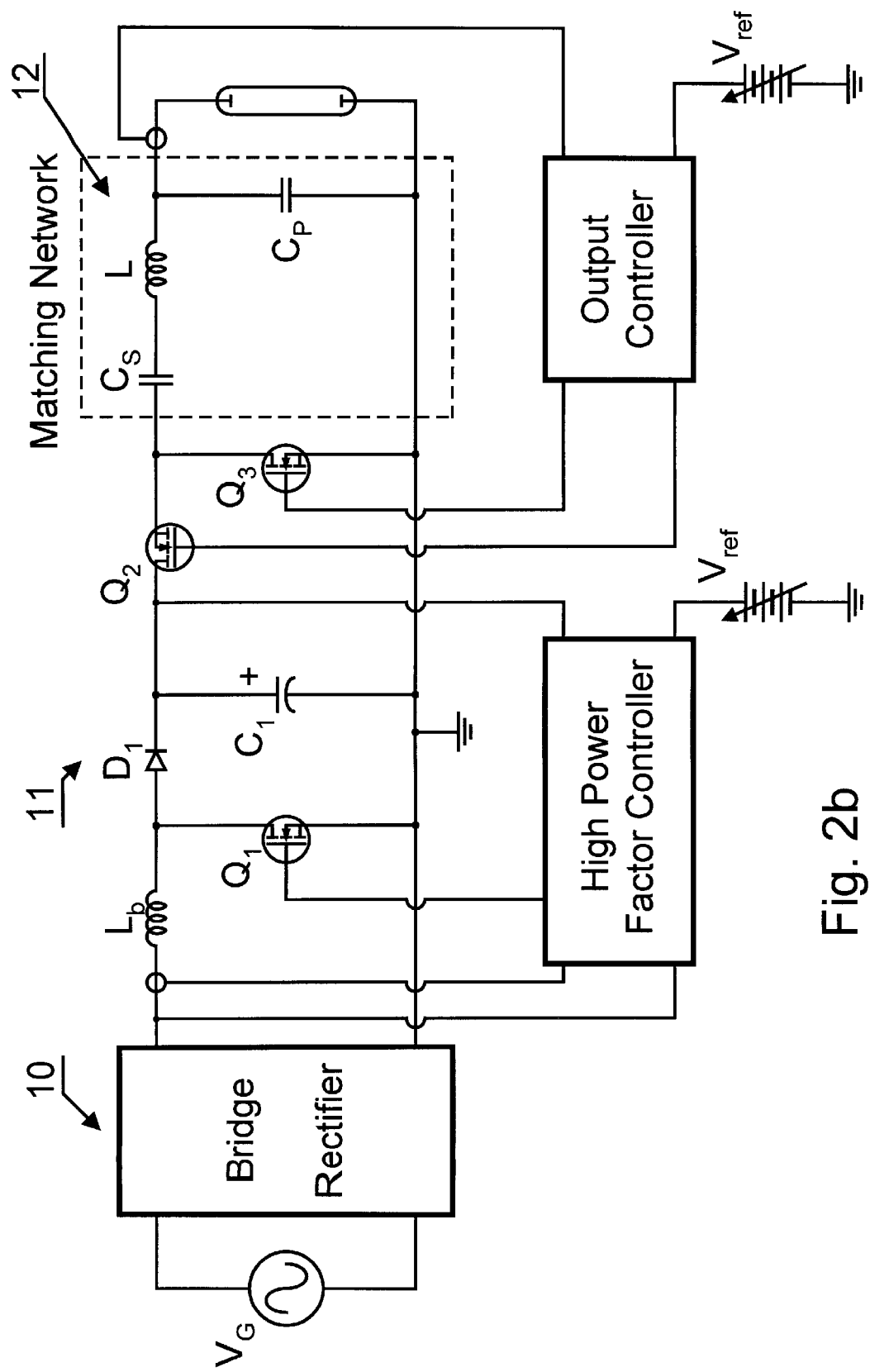
FIG. 2b shows an implementation of a prior-art high-frequency electronic ballast having two stages, a unity power factor preregulator and a half bridge followed by a matching network.
Figure 2C:
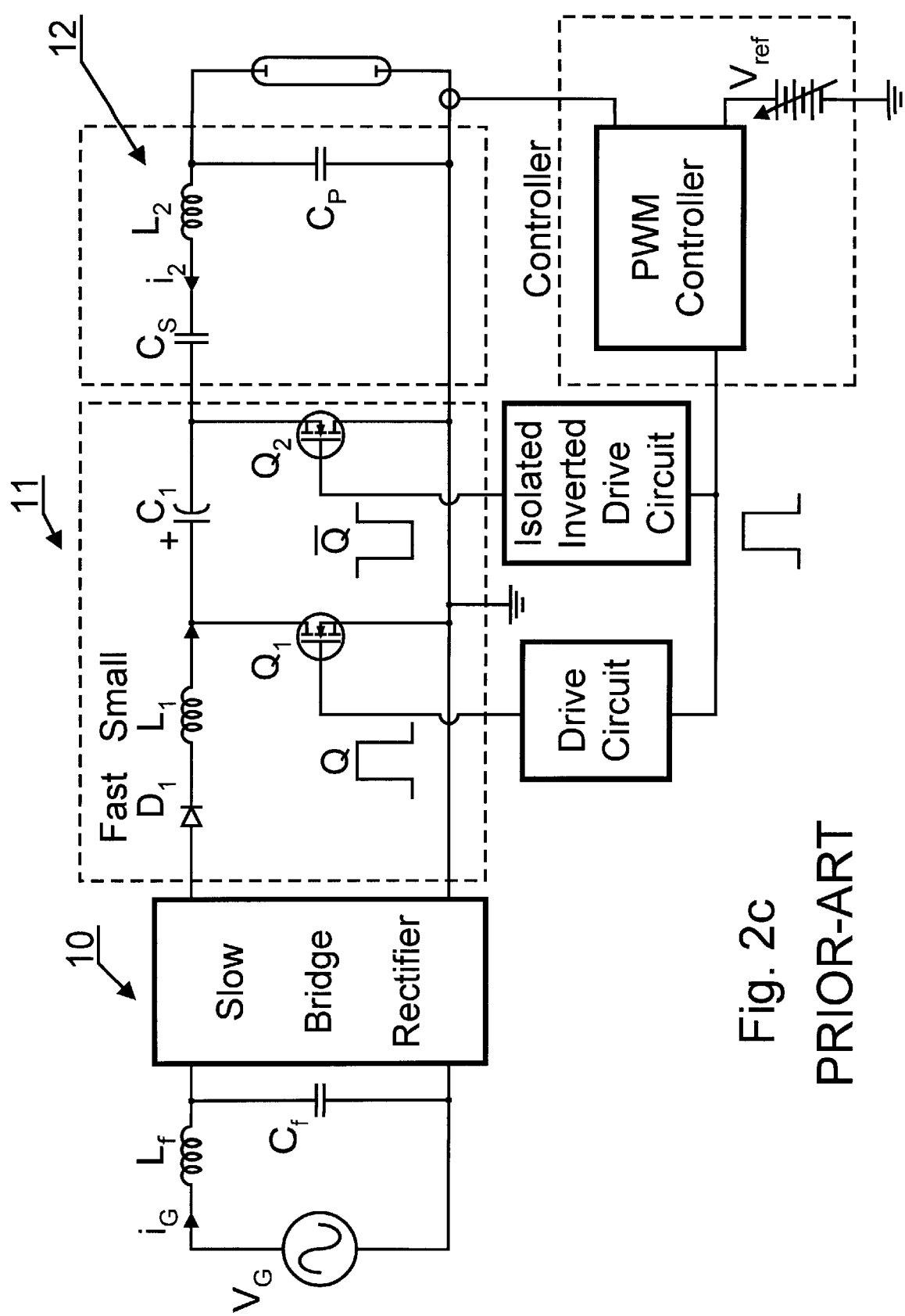
FIG. 2c shows an implementation of a prior-art high-frequency electronic ballast having a single stage providing input unity power factor at the input and a square wave voltage at the output, which is applied to the lamp through a matching network.

Instead the invention uses the high output impedance of the switching converter operating in DCM to stabilize the lamp. The prior-art uses converters operating in DCM, such as the prior-art ballast of FIG. 2c, but the DCM operation is used to provide unity power factor in the input, not to stabilize the lamp; instead the prior-art ballast uses a matching network to stabilize the lamp. From the block diagram of FIG. 3a, it is clear that the DCM switching converter 22 must fulfill all three distinct tasks:

Draw a sinusoidal current from the input to satisfy input power factor requirements, i.e., the DCM converter must act as a unity-power factor input current shaper.

Ensure stable lamp operation.

Provide at startup a voltage high enough to strike the lamp.

Almost any dc—dc switching converter operating in discontinuous conduction mode (DCM) at constant duty cycle D with no line frequency energy storage can perform these three tasks. An example is the buck-boost converter of FIG. 4.

Figure 5:
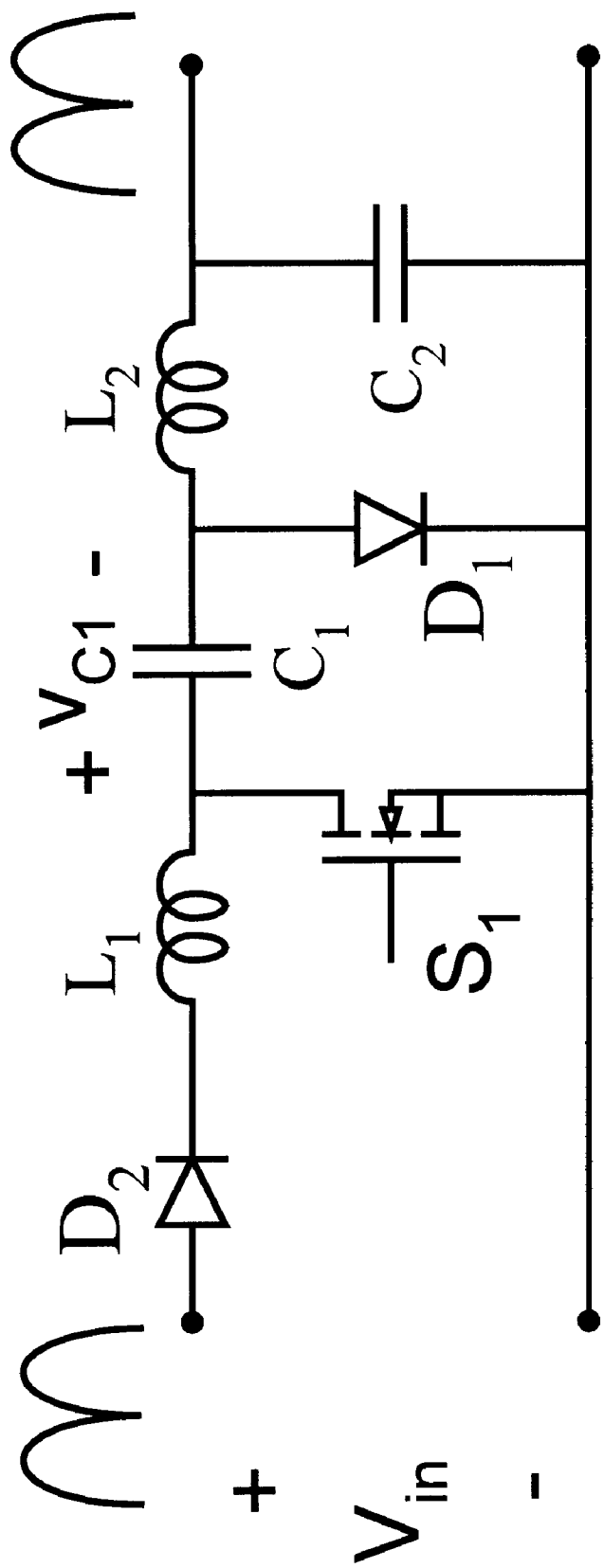
FIG. 5 is a schematic diagram of the central DCM switching converter in a preferred embodiment of FIG. 3a, namely a Cuk converter operating in discontinuous conduction mode of diode $D_2$.

A preferable switching converter is the Cuk converter of FIG. 5. It is particularly well suited for this application because it can operate in DCM with continuous current at the output. In the case of the buck-boost converter, the output current is discontinuous so that an additional filtering stage may be needed at the output.

Figure 6:
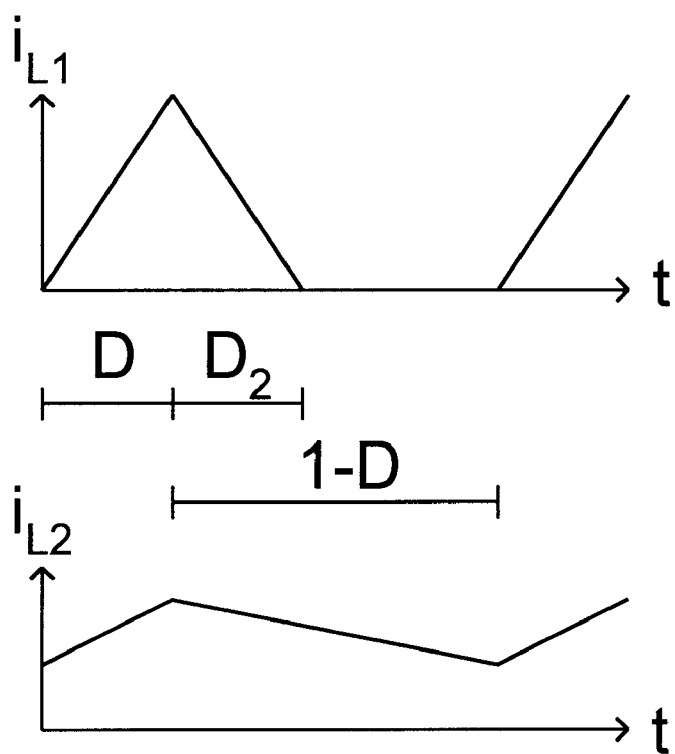
FIG. 6 shows input and output inductor current waveforms of the Cuk converter of FIG. 5 operating in discontinuous conduction mode of diode $D_2$.

Note that there is a fast diode $D_2$ in series with input inductor $L_1$ but that a separate diode is not needed if the diode bridge rectifier of FIG. 3a has at least two fast diodes. This dc—dc converter topology has been used for an automatic current shaper. (M. Brkovic and S. Cuk, "Automatic Current Shaper with Fast Output Regulation and Soft Switching," INTELEC 93, 1993, pp. 379–386.) In that application, energy transferring capacitor $C_1$, was large because it was used for low-frequency energy storage. In other shaper applications capacitor $C_2$ is large. In this invention, all capacitors are small, so that the converter stores negligible energy at line frequency. As described in the INTELEC paper cited above, the converter of FIG. 5 has various distinct discontinuous conduction modes, depending on which diode ceases conducting during the OFF interval. Since a continuous lamp current with small switching frequency ripple is desired, the discontinuous conduction mode due to input diode $D_2$ is used. The currents in input inductor $L_1$ and output inductor $L_2$ are shown in FIG. 6. Notice that the input inductor current has high ripple, whereas the output inductor current is continuous. Diode $D_1$ operates in continuous conduction mode, i.e., it conducts during the entire OFF interval. Under these conditions, this topology is equivalent to the cascade of a boost converter operating in discontinuous conduction mode (DCM) and a buck converter operating in continuous conduction mode (CCM). Analysis of this topology is given by S. Cuk in "Discontinuous Inductor Current Mode in the Optimum Topology Switching Converter," IEEE Power Electronics, Specialists Conference, 1978, Record, pp. 160–179 and also in R. D. Middlebrook and S. Cuk, "Advances in Switched-Mode Power Conversion, TESLAco, 1983, pp. 365–384. Nevertheless, that analysis is briefly reviewed here. DCM coefficients $K_1$ and $K_2$ are defined as:

$$K_1 = \frac{2L_1}{R}f_s \tag{1}$$

$$K_2 = \frac{2L_2}{R}f_s \tag{2}$$

The condition for CCM operation of the buck stage is $$K_2 > K_{2crit} = 1-D \tag{3}$$

and the condition for DCM operation of the boost stage is $$K_1 < K_{1crit} = \frac{(1-D)^2}{D} \tag{3}$$

Equations (3), (4) are used in the design to select values of input inductor $L_1$ and output inductor $L_2$. The DC voltage gain of the boost and the buck stages are respectively $$M_1 = \frac{1 + \sqrt{1 + 4/K_1}}{2} \tag{5}$$

$$M_2 = D \tag{6}$$

and the overall gain is $$M = M_1 M_2 = \frac{1 + \sqrt{1 + 4/K_1}}{2} D \tag{7}$$

DCM Converter as a Unity-Power-Factor Input Current Shaper

The following general statement can be made:

Take any switching converter with no line frequency energy storage operated at constant duty cycle D; constant switching frequency f1s, and with a constant resistive load R. Assume also that the converter operates in discontinuous conduction mode throughout the entire power line period, i.e., it does not change mode of operation. Such a converter is a unity-power-factor input current shaper.

Following the general analysis given by S. Cuk and R. D. Middlebrook, "A General Unified Approach to Modeling Switching DC-to-DC Converters in Discontinuous Conduction Mode," in "Advances in Switched-Mode Power Conversion," TESLAco, 1983, pp. 109–130 voltage gain $M=v_0/v_{in}$ is given by $$M=f(D,R,f_s,L) \tag{8}$$

where L is some inductor or combination of inductors in the switching converter. According to the above assumptions, quantities D. R, $f_s$, L are constant. It follows from equation (8) that voltage gain M is a constant also. Since the converter has no energy storage and the load is purely resistive, the dc voltage gain M represents also the instantaneous voltage gain of the converter. The input impedance of the converter is $$R_{in} = \frac{R}{M^2} \tag{9}$$

and it is a constant. Therefore, the converter acts like a constant resistor and it is a unity-power-factor input current shaper.

Figure 4:
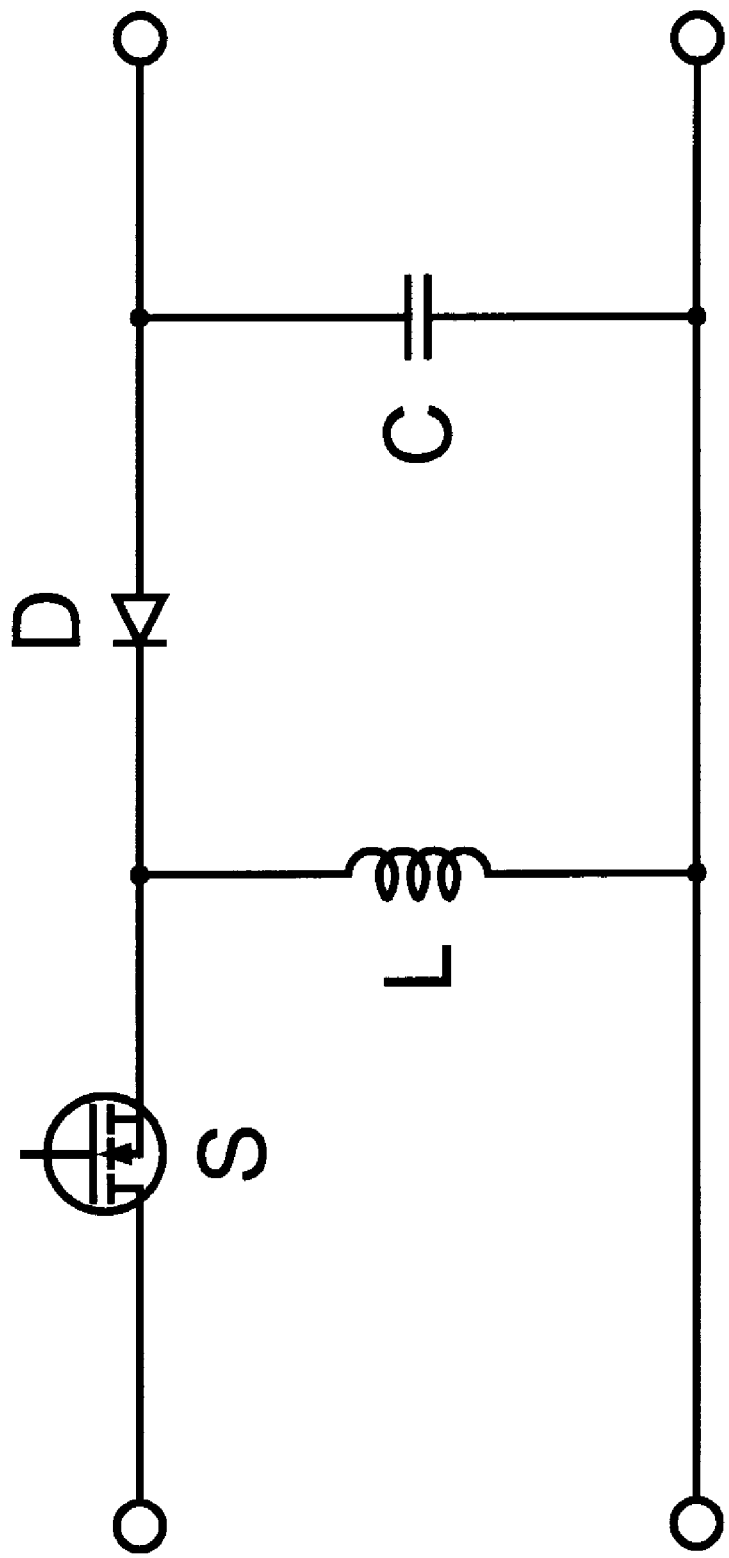
FIG. 4 illustrates a possible implementation of the central DCM switching converter of FIG. 3a, namely a buck-boost converter operating in discontinuous conduction mode.

This proves that any converter operating in DCM with no line frequency energy storage is a unity-power-factor input current shaper. In particular, the converters of FIGS. 4 and 5 are indeed a unity-power-factor input current shaper.

The automatic current shaper performance has been verified experimentally on a prototype of the invention. With a resistive load, the total harmonic distortion (THD) of the input current measured on the prototype was 3.2%. With a. lamp load the nonlinear load resistance introduces some additional distortion, so the measured THD with lamp load was 8.8%.

DCM Switching Converter Stabilizes Lamp Current

The switching converter used as a ballast stabilizes the lamp current because the converter operating in DCM has a positive output impedance that compensates the negative incremental impedance of the lamp. In order to study the stability of the DCM ballast, a simpler case is examined first: a resistive ballast operating from a dc input source. See also W. Eleribaas, Ed. *"Fluorescent Lamps and Lighting,"* Macmillan, London, pp. 78–81.

Stability of DC Resistive Ballast

Figure 7:
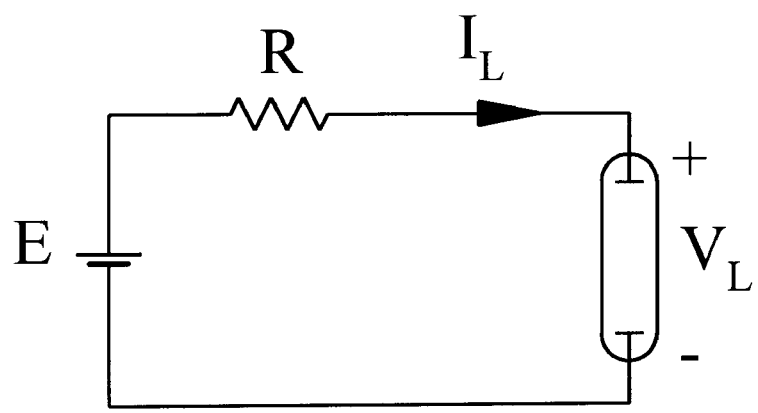
FIG. 7 shows a dc resistive ballast consisting of a resistor R connected between a dc source E and a lamp. (Means for striking the lamp are not shown.)

A dc resistive ballast is shown in FIG. 7. It consists of a resistor R connected between the input dc voltage E and the lamp. In practice, additional circuitry may be needed to strike the lamp. The loop equation of this circuit is $$E = RI_L + V_L \tag{10}$$

The lamp characteristic is given by $$V_L = R_L I_L \tag{11}$$

where lamp resistance $R_L$ is nonlinear. The dc lamp characteristic and the characteristic of the rest of the circuit are shown in FIGS. 8a and 8b for different values of R. The intersections of the two curves represent possible operating points. Point A of FIG. 8a is an unstable operating point, whereas point B of FIG. 8b is a stable operating point.

Examining point A first, if there is a small perturbation and the current increases it is clear from the slopes of the characteristics of FIG. 8a that there will be more voltage available to the lamp than is needed to support the lamp current. As a result the lamp current will increase further and the operating point will move away from point A. The equilibrium point A is unstable.

Examining point B of FIG. 8b. If there is a small perturbation and the current increases there will be less voltage available to the lamp than is needed to support the increased lamp current. As a result, the lamp current will decrease and the operating point will move back towards point B. Equilibrium point B is stable.

In conclusion the equilibrium point is stable if the slope of the lamp characteristic is less than the slope of the characteristic of the rest of the circuit. Therefore, the stability condition is that the lamp incremental impedance (which is the slope of the lamp characteristic and is negative) must be smaller in magnitude than the ballast resistance.

Performing a small signal analysis will give the same results. Perturbation of equations (10), (11) gives $$\hat{v}_L = \tilde{R}_L \hat{i}_L \tag{12}$$

$$\hat{E} = R\hat{i}_L + \hat{v}_L \tag{13}$$

$\tilde{R}_L$ is the lamp incremental impedance and it is negative. Combining equations (12),(13) we obtain $$\hat{E} = (R + \tilde{R}_L)\hat{i}_L \tag{14}$$

The stability condition is $$R > |\tilde{R}_L| \tag{15}$$

and it says that the lamp incremental impedance $\tilde{R}_L$ be smaller in magnitude than the ballast resistor R.

Stability of Proposed Ballast

Considering next the stability of the present DCM ballast of FIGS. 3a–5, in order to proceed with the stability analysis in a way analogous to the dc ballast, the converter output characteristic and the lamp characteristic need to be described, i.e., the expressions analogous to equations (10) and (11) used for the dc ballast need to be found.

Figure 9:
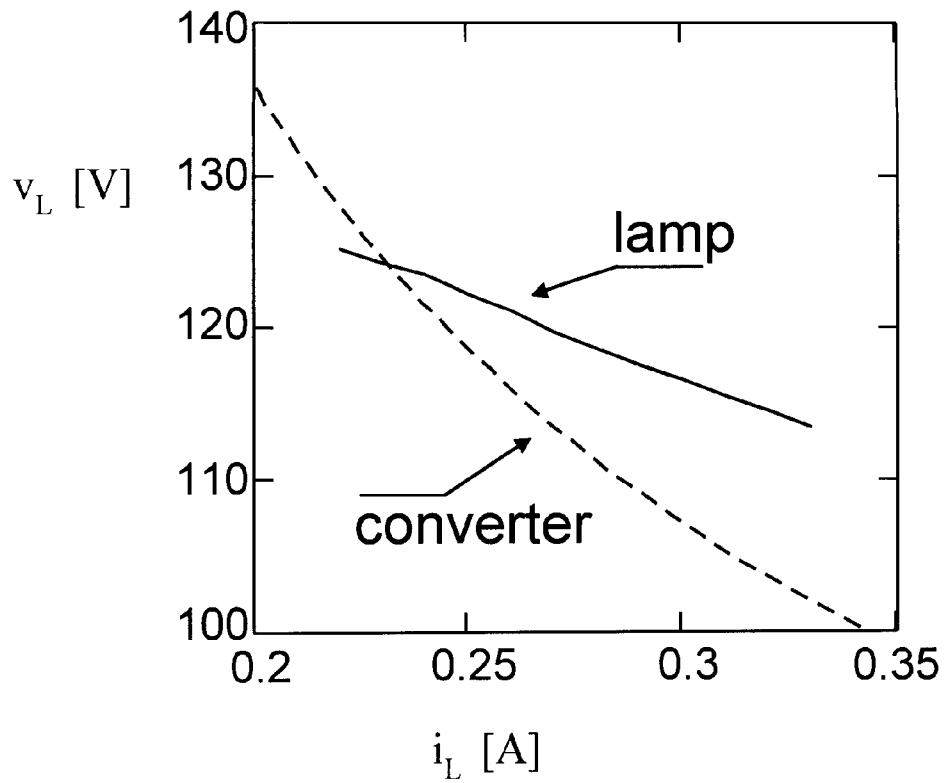
FIG. 9 shows the measured characteristic of a 400 Hz ac lamp and the calculated output characteristic of the converter using the values given in the practical implementation.

The dc lamp characteristic for 400 Hz lamp operation is obtained experimentally measuring average lamp voltage and current. The converter output characteristic can be calculated analytically following the approach given in the IEEE paper by S. Cuk cited above and is plotted together with the lamp characteristic in FIG. 9. X-axis represents lamp current in amperes and Y-axis represents lamp voltage in volts. The higher slope of the DCM ballast converter characteristic proves that the lamp operation is stable. It can be clearly seen that the slope of the converter characteristic is steeper than the lamp characteristic, denoting stable operation.

A small-signal analysis can also be performed. Define the constant $$A = \frac{2}{L_1 f_s}. \tag{16}$$

Figure 10:
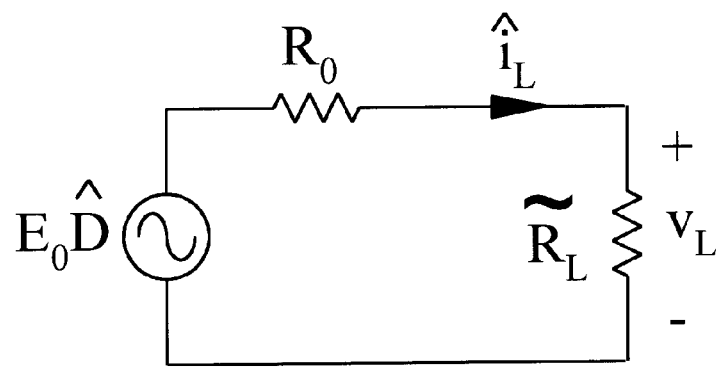
FIG. 10 is the small-signal model of a DCM ballast, which is analogous to the dc ballast of FIG. 7.

After an averaging step and a perturbation step, the small-signal equation $$E_0 \hat{D} = R_0 \hat{i}_L + \tilde{R}_L \hat{i}_L \tag{17}$$

is obtained, where $$R_0 = \frac{AR_L^2}{2 + 2\sqrt{1 + AR_L} + AR_L} \tag{18}$$

$$E_0 = \frac{2}{\pi} V_{in} \frac{1 + \sqrt{1 + AR_L}}{2} \left(1 + \frac{R_0}{R_L}\right) \tag{19}$$

where $R_L$ is the large-signal lamp resistance at the lamp operating point. Equation (17) shows that the small signal model of the DCM converter is given by a voltage source $E_0 \hat{D}$ followed by output resistance $R_0$. This equation is analogous to equation (13). This model is shown in FIG. 10. The lamp is represented by its incremental resistance $\tilde{R}_L$, which is negative. The stability condition is analogous to equation (15) and it is $$R_0 > |\tilde{R}_L| \tag{20}$$

Figure 11:
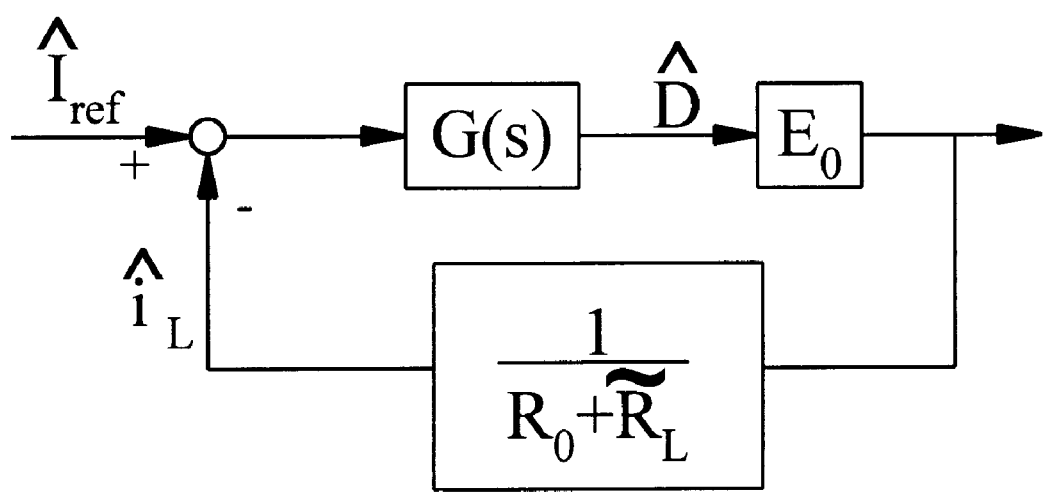
FIG. 11 is a block diagram of a closed-loop DCM ballast for lamp current control, i.e., for dimming the lamp intensity.

If a feedback loop is closed around the ballast to control the average (rectified) lamp current, the block diagram of FIG. 11 represents the small-signal closed-loop behavior of the lamp. Block G(s) represents the compensation. The input to this block is the lamp current error and the output is the duty cycle $\hat{D}$. The remaining two blocks represent the small signal ballast model of FIG. 10. It is clear from this model that, as long as equation (20) is satisfied, it is a simple task to close the feedback loop.

Design and Practical Implementation

A prototype was built and tested. The lamp used was a Sylvania T-8 32W rapid start. The nominal voltage and current are 125 Vrms and 0.24 Arms, which gives a nominal impedance $R_L$=520 Ω. Input voltage is 115 Vrms, 400 Hz. Nominal frequency is $f_s$=37 kHz and nominal duty cycle is D=0.45

Figure 12:
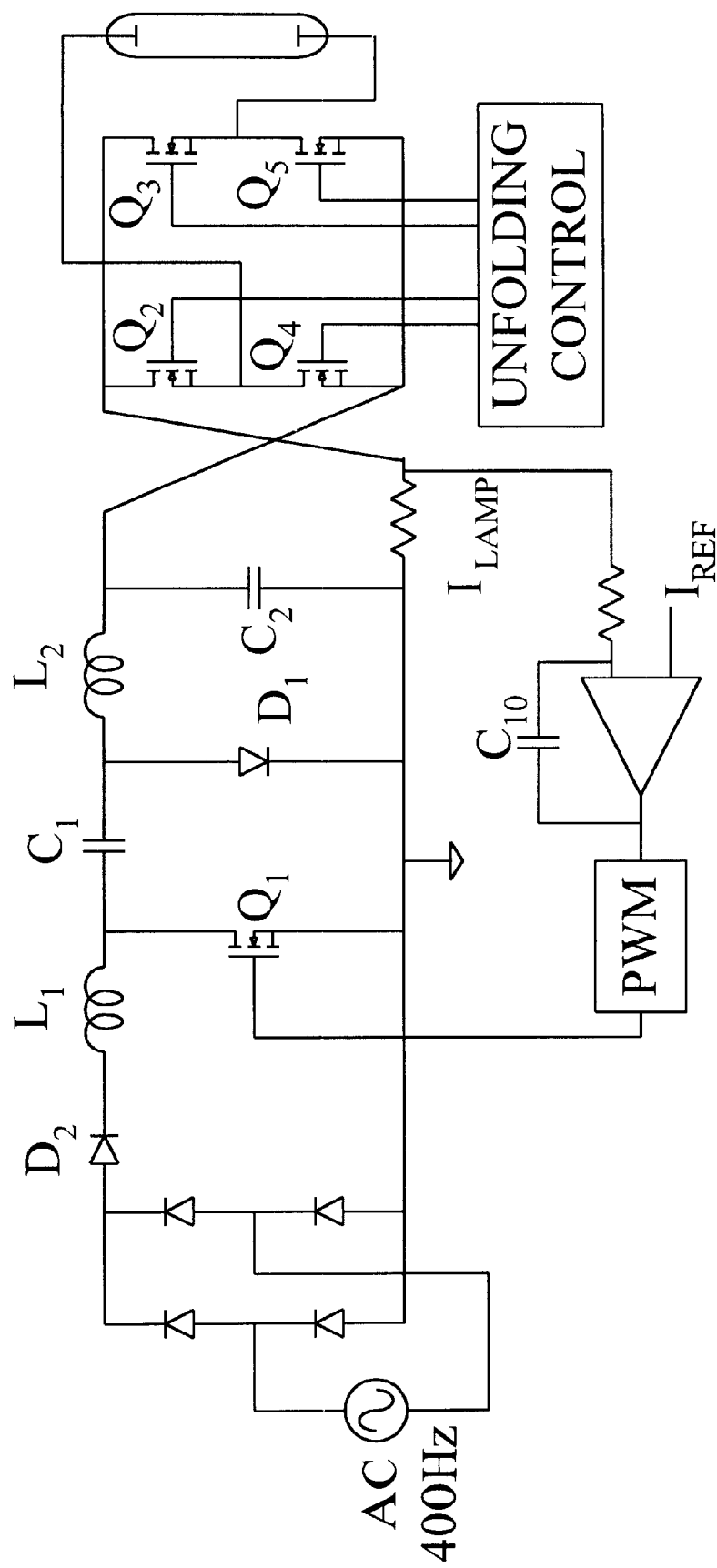
FIG. 12 is a simplified schematic of a DCM ballast.

A simplified schematic of the ballast implementation is shown in FIG. 12. Diode $D_2$ is the fast diode that forces DCM operation. Capacitors $C_1$, $C_2$ are sized to have a relatively small voltage ripple at the switching frequency. The value of inductor $L_1$ is chosen to ensure discontinuous conduction mode of diode $D_2 0$ using equation (4). The value of inductor $L_2$ must satisfy equation (3) and determines the lamp current ripple at the switching frequency. Since the purpose of this design was to obtain a ballast with line frequency lamp current, a rather large value of $L_2$ was desirable. The unfolding control turns on switches $Q_2$–$Q_5$ and $Q_3$–$Q_4$ alternatively every time the ac input voltage crosses zero. Since these switches operate at twice the line frequency, they do not need to be fast. A dead time is introduced to avoid cross-conduction.

The PWM control may be operated either open-loop at constant duty cycle or closed loop. In both cases a voltage-limiting loop should be implemented to limit the output voltage and protect switch $Q_1$, in case the lamp is removed. In the case of closed-loop control, the rectified lamp current is sensed and an integrator is used for the feedback. In closed-loop operation, dimming of the lamp is possible.

Components used in the prototype are $D_2$=BYV26, $Q_1$=BUZ80- $Q_2$, $Q_3$, $Q_4$, $Q_5$=IRF840, $C_1$=47nF, $C_2$=22nF, $L_1$, =1.8 mH, $L_2$=30 mH. A 400 Hz transformer is used to provide heating for the lamp filaments.

Experimental Results

Figure 13A:
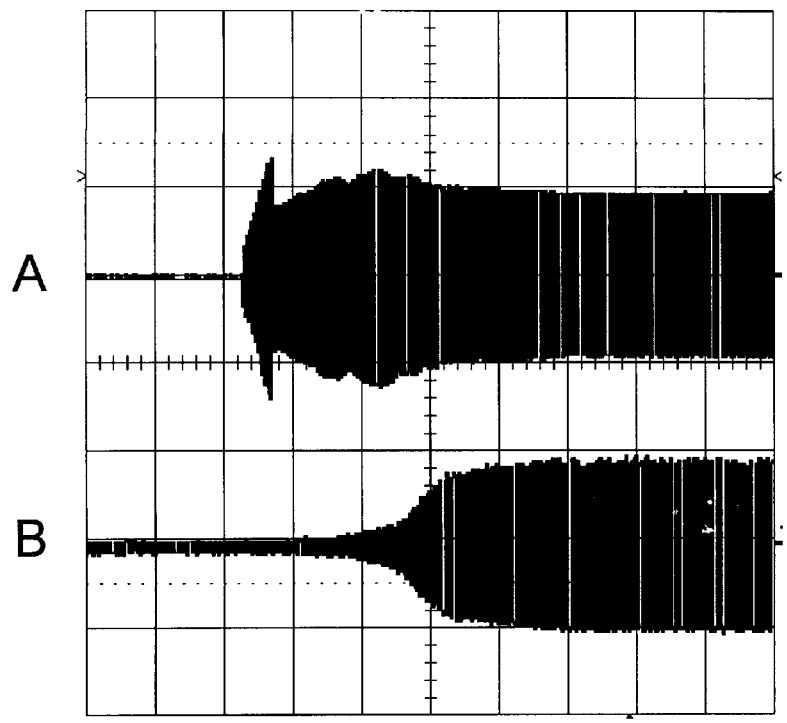
FIG. 13a shows oscilloscope traces of the lamp turn-on transient, the upper trace A being of lamp voltage 200 V/div; and the lower trace B being lamp current 0.5 A/div.

Lamp turn-on is shown in FIG. 13a. Note how the lamp voltage increases until the lamp strikes. No special provision is required to provide the high voltage needed to strike the lamp. The DCM operation provides this high voltage naturally: before the lamp strikes, the DCM converter sees a very high load resistance and the converter output voltage in that condition is very high, because voltage gain (7) is high.

Figure 13B:
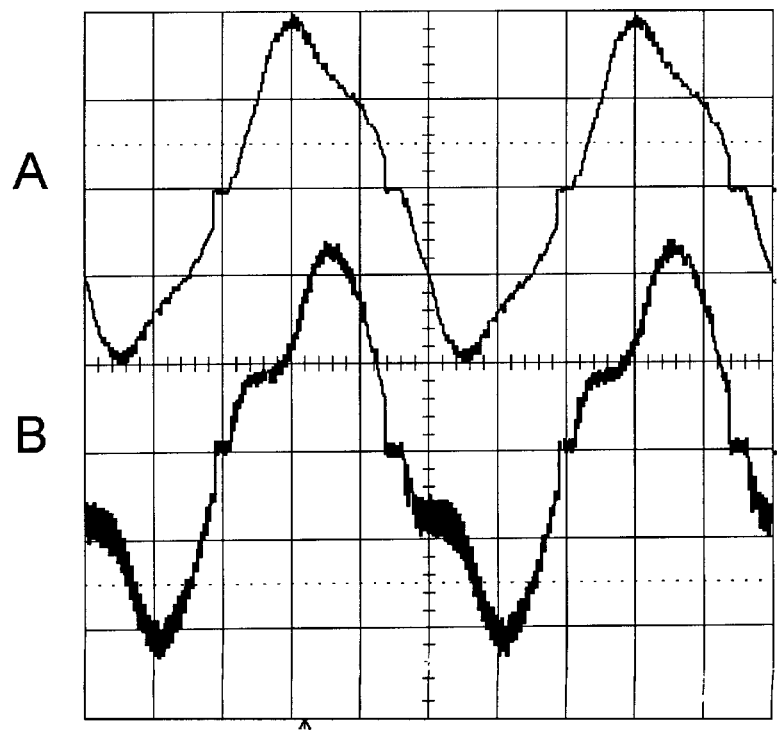
FIG. 13b shows oscilloscope traces of steady-state operation, the upper trace A being of lamp voltage 100 V/div; and the lower trace B being of lamp current 0.2 A/div.
Figure 13C:
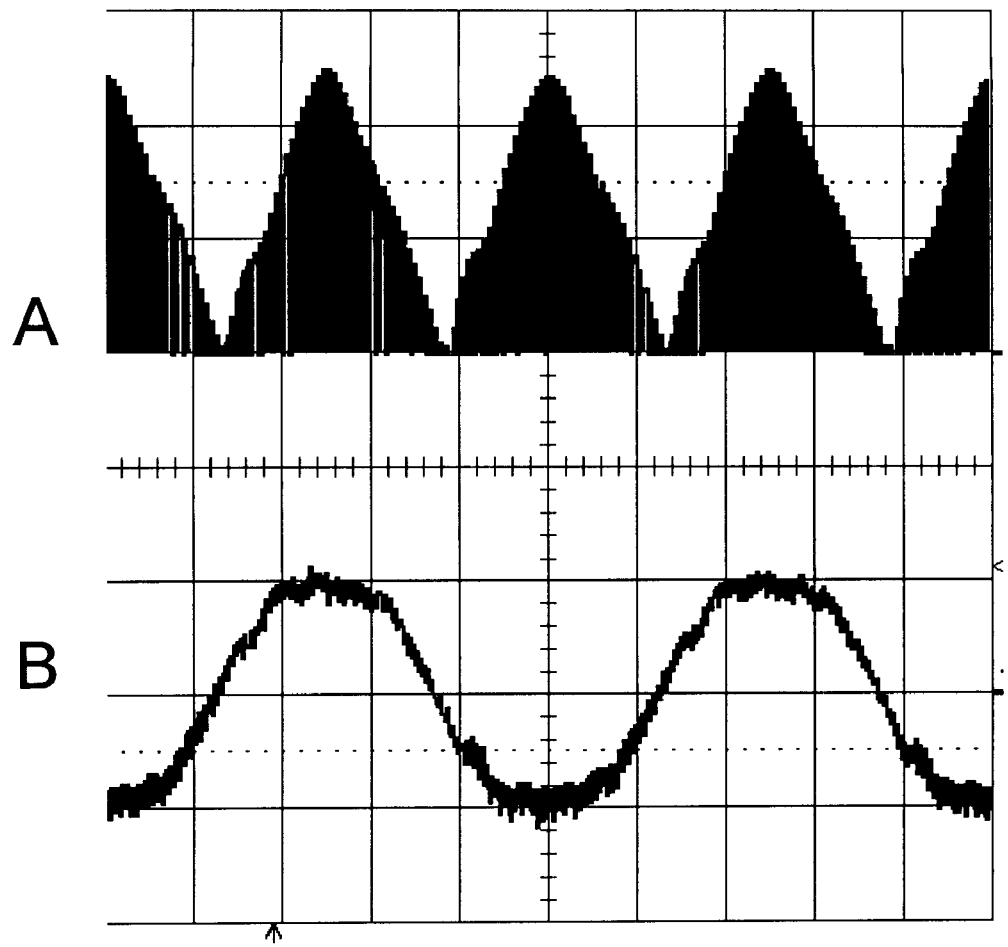
FIG. 13c shows oscilloscope traces of steady-state operation, the upper trace A being of main switch voltage 200 V/div; and the lower trace B being of input current 0.5 A/div.

Lamp voltage and lamp current in nominal operation are shown in FIG. 13b. Lamp voltage and current are approximately sinusoidal. The distortion in the voltage and current waveforms are typical of low-frequency ballasts, as can be seen in the figure at page 104 of W. Elenbaas, cited above. The cross-over distortion is due to the dead time in the unfolding stage. Switch voltage and input current are shown in FIG. 13c. Note the high input power factor. The measured input current THD is 8.8%.

Description of the Preferred Embodiments

The invention in its more general form is shown in FIG. 3a, where the "DCM switching converter" block is any switching converter operating in DCM with no line energy storage. The invention guarantees low radiated noise because of the low frequency lamp voltage and current, high power factor at the input, stable lamp operation, small size and weight. The ballast can be operated open-loop or a closed-loop control can be used for continuous lamp dimming.

A first preferred embodiment of the invention is shown in FIG. 5 when the switching converter is as shown the Cuk converter of FIG. 5.

A second preferred embodiment of the invention is when the switching converter is the buck-boost converter of FIG. 4.

Figure 14:
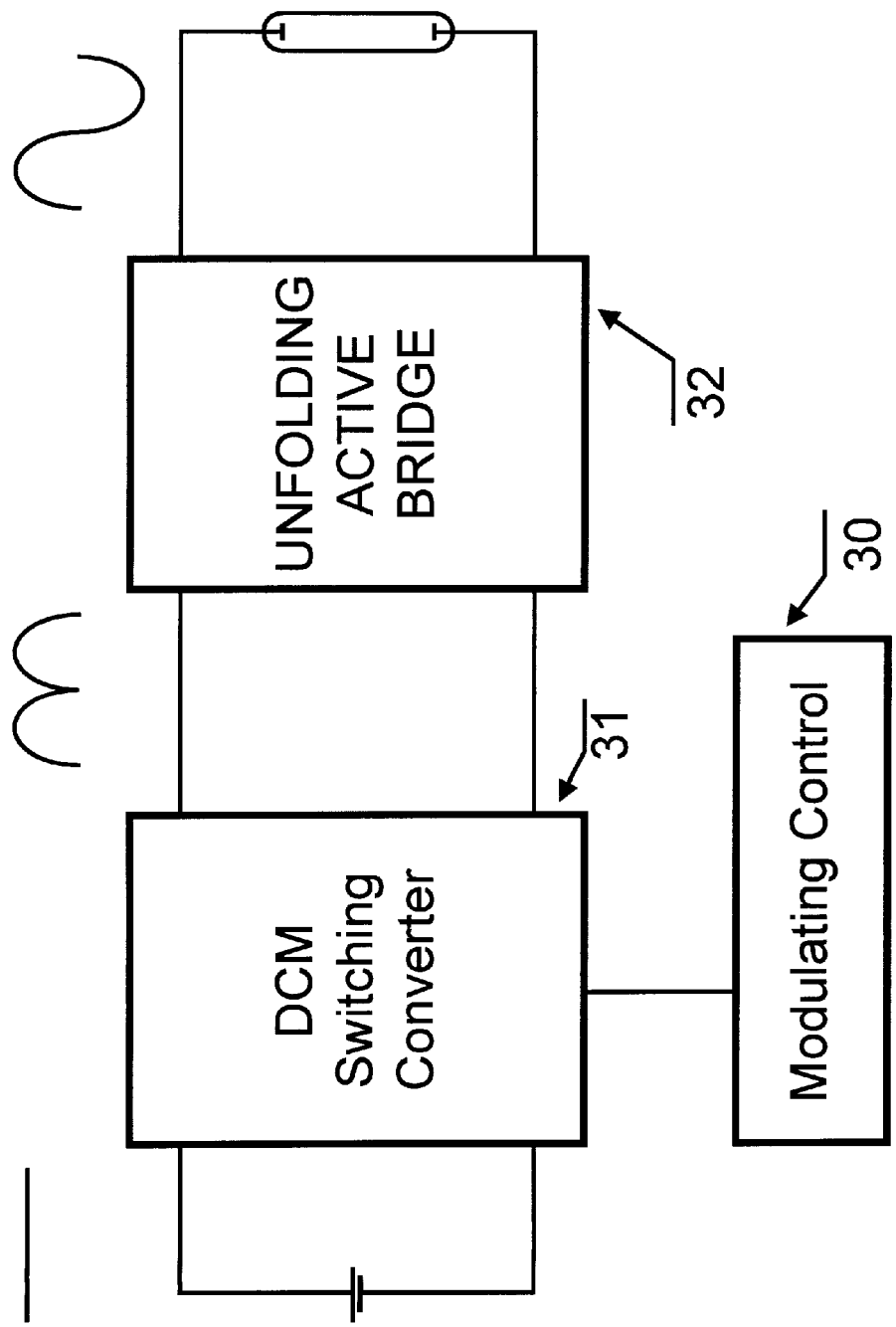
FIG. 14 shows a block diagram for the invention in the case of applications requiring a dc input voltage.

A third embodiment is an extension as shown in FIG. 14 for the case of dc input voltage. The diode bridge is not needed and the switching control 30 provides a modulated duty cycle, D, which creates a rectified sinusoidal voltage at the output of the switching converter 31. The modulation frequency can be chosen arbitrarily but should be chosen low enough to avoid radiated noise problems. The unfolding stage 32 is synchronized with the rectified sine wave and unfolds it, providing a sinusoidal voltage and current to the lamp.

Although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A high power factor, gas discharge lamp ballast comprising
    means for full wave rectifying low frequency ac line voltage,
    switching power conversion means connected to said ac voltage rectifying means for generating at the output a second low frequency rectified sine wave voltage at the same frequency of said low frequency ac voltage,
    a rectified sinusoidal voltage unfolding means which has as input said second low frequency rectified line wave voltage and generates unrectified output low frequency sine wave voltage needed to drive said gas discharge lamp,
    said switching power conversion means comprising a dc-to-dc switching power converter operating in discontinuous conduction mode and with no line frequency energy storage,
    switching control means for operating said switching power conversion stage at a fixed switching frequency and at a constant duty ratio in a mode of control selected from open-loop and closed-loop control of the current in said gas discharge lamp,
    said unfolding means comprising an arrangement of controlled switches having one of said controlled switches between each of the two input terminals and each of the two output terminals, allowing to connect input terminals to output terminals with direct or inverse polarity,
    control mean for operating said controlled switches of said unfolding means for reversing polarity of connection between said input terminals and said output terminals at each zero crossing of said ac line voltage thereby converting said second low frequency rectified sine wave into said output low frequency sine wave,
    whereby said switching power conversion stage operating in discontinuous conduction mode draws a current from said ac voltage rectifying means whose average very closely follows instantaneous line voltage for near unity power factor operation while operating at a fixed switching frequency and a constant duty ratio, and provides a high output impedance to said gas discharge lamp guaranteeing stable lamp operation.

2. A high power factor gas discharge ballast as defined in claim 1 wherein said ac voltage rectifying means includes a lowpass filter to reduce input current ripple.

3. A high power factor gas discharge ballast as defined in claim 1 wherein said switching power conversion stage comprises
    an input inductor, an energy transfer capacitor, and an output inductor connected in series between said ac voltage rectifying means and said unfolding stage,
    a controllable switch connecting the junction of said input inductor and said storage capacitor to a return current path,
    a diode having its anode connected to the junction of said output inductor and said storage capacitor and having its cathode connected to a return current path,
    a fast recovery semiconductor diode means connected in series with said input inductor,
    an output capacitor connected between said unfolding stage and a return current path,
    said energy transfer capacitor and said output capacitor storing negligible energy at the line frequency,
    whereby said fast recovery semiconductor diode means in conjunction with said input inductor chosen to be less than a predetermined critical inductance, forces said switching power conversion stage into a discontinuous inductor current mode, such that average input inductor current very closely follows instantaneous line voltage for near unity power factor operation while operating at a fixed switching frequency and a constant duty ratio.

4. A high power factor gas discharge ballast as defined in claim 2 wherein the function of said fast recovery semiconductor diode means in series with said input inductor for said discontinuous conduction mode is implemented by using a fast recovery semiconductor diode in series between said ac voltage rectifying means.

5. A high power factor gas discharge ballast as defined in claim 2 wherein the function of said fast recovery semiconductor diode means in series with said input inductor for said discontinuous conduction mode is implemented by using fast recovery semiconductor diodes for implementation of said full wave rectifying means.

6. A gas discharge lamp ballast for dc input voltage comprising a switching power conversion stage connected to said dc input voltage generating at the output a low frequency rectified sine wave voltage at a desired frequency, an unfolding stage which has as input said low frequency rectified sine wave voltage and generates a (not rectified) output low frequency sine wave voltage needed to drive said gas discharge lamp, said switching power conversion stage consisting of a dc—dc switching power converter operating in discontinuous conduction mode with no line frequency energy storage, switching control means for operating said switching power conversion stage at a fixed switching frequency and with duty ratio modulated in such a way to create said low frequency rectified sine wave, said unfolding stage consisting of an arrangement of controlled switches having one of said controlled switches between each of the two input terminals and each of the two output terminals, allowing to connect input terminals to output terminals with direct or inverse polarity, control means for operating said controlled switches of said unfolding stage and reversing polarity of connection between said input terminals and said output terminals at each zero crossing of said ac line voltage thereby converting said second low frequency rectified sine wave into said output low frequency sine wave, whereby said switching power conversion stage operating in discontinuous conduction mode provides a high output impedance to said gas discharge lamp guaranteeing stable lamp operation.

* * * * *